July 30, 1940. A. REDLER 2,209,476
ENDLESS CHAIN CONVEYER
Filed Feb. 11, 1937
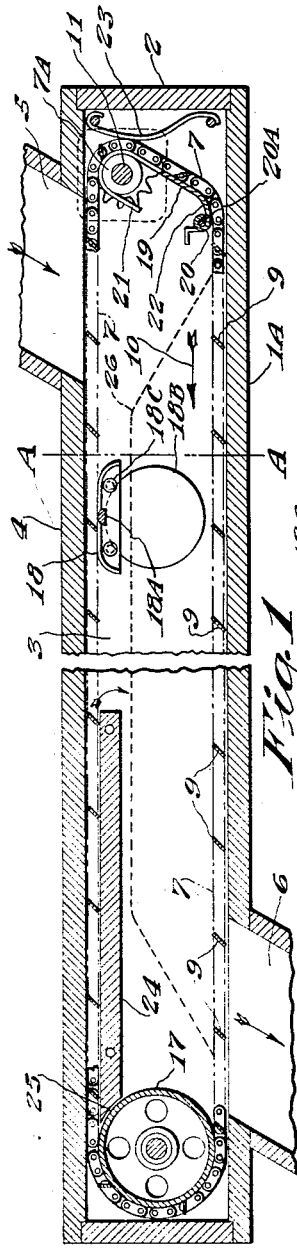
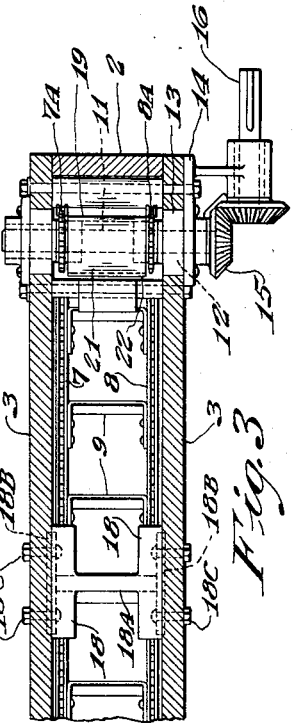
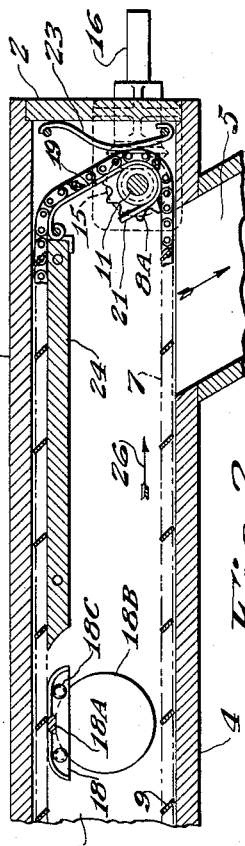
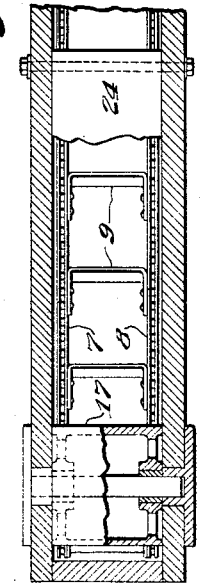
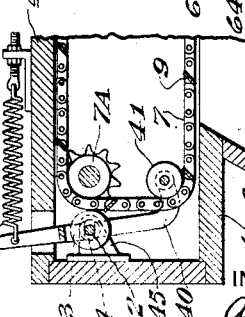
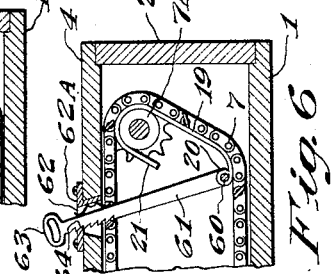
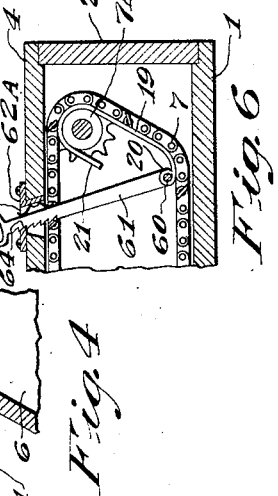
INVENTOR
Arnold Redler
BY J. Stanley Churchill
ATTORNEY Patented July 30, 1940

2,209,476

UNITED STATES PATENT OFFICE 2,209,476

ENDLESS CHAIN CONVEYER

Arnold Redler, Stroud, England, assignor to Redler Conveyor Company, New York, N. Y.

Application February 11, 1937, Serial No. 125,334
In Great Britain February 18, 1936

12 Claims. (Cl. 198—168)

This invention relates to endless chain conveyers in which a chain (or equivalent flexible tension element) carries transverse flights, which is intended primarily to operate on the en masse principle, i. e., in which neighbouring flights co-operate to convey a load of flowable material such as granular or powder or comminuted solid material. It is an object of the invention to provide a conveyer with the attributes of economical manufacture and installation, and economical driving means. A further object is the provision of a conveyer in what may be regarded as a standardised form but which will be reversible in operative direction. A further object of the invention is the provision in such a conveyer of means whereby the chain, whilst being kept in a sufficient tension for driving purposes during operation, may readily be released for adjustment, for example by the removal of links.

With these and other objects in view, a conveyer according to the invention has an endless chain or other closely articulated, or flexible, tension member, at least one run of which operates in a trough or equivalent conduit, the chain having transverse projections for engaging the conveyed material; and a driving terminal sprocket or equivalent adapted to engage the chain and drive it is provided within the conduit towards an end thereof beyond the point from which or to which material is admitted or delivered, and this sprocket is of less diameter than the depth of the trough, and also in the trough there is provided a chain tensioning device in the form of guiding means such as a fairlead or a jockey roller or pulley adapted to regulate the initial tension of the chain by determining its path in its circuit. The invention further includes constructional features which can be understood from the following description with the aid of the accompanying diagrammatic drawing, in which:

Figure 1 is a partly sectioned side elevation of a complete conveyer unit;

Figure 2 illustrates how the same unit is adapted for reversal;

Figure 3 is a plan view of the conveyer as arranged in Figure 1; Figures 1, 2 and 3 are fragmentary, having been shortened for the purposes of drawing;

Figure 4 is an illustration in side elevation of a modified chain tensioning means;

Figure 5 of a further modified tensioning means; and

Figure 6 similarly illustrates a modification of tensioning means in accordance with Figure 5.

Turning to Figures 1 and 3, the complete conveyer comprises a trough which may be fabricated of wood and which has a floor 1 continuous throughout its length, an end wall 2 at the driving end, and another end wall at the other end. The trough has side walls 3 and a top cover or roof 4. The roof 4 has an inlet chute 5 towards the driving end, and an outlet chute 6 towards the other end. In the trough there runs a continuous circuit of roller chain. This is made up of two chains 7, 8, at each side of the trough and running in planes parallel with the walls 3. The chains are roller chains closely articulated and may be bicycle chain, that being a readily available commodity. The chains 7 and 8 are interconnected by transverse flights (as the conveyer elements of en masse are often called) 9, and these are preferably flat strips of metal attached to the inner faces of the chains by two adjacent rivets and inclined with reference to the floor 1 and roof 4, in such a manner that they have a self-burying tendency in the conveyed load; the intended direction of conveying is illustrated by the arrow 10, and it will be seen that in relation to that arrow the flights are inclined upwardly and rearwardly. The chains 7, 8, at the driving end, engage a pair of sprockets 7A, 8A, which are pinned on the driving spindle 11 which is mounted rotatably in one wall 3 is a suitable bush, and in the other wall 3 is bushed at 12 in a boss fitting 13, with an external attaching plate 14. The fitting 13 is of a greater overall diameter than the sprockets 8A, so that, when the fitting 13 is removed by detaching the plate 14 from the wall 3, the spindle 11 and its sprockets can be withdrawn clear without other disturbance. The outer projecting end of the spindle 11 has a bevel drive represented by 15 from a motor or power shaft 16. At the other end of the trough an idle terminal roller 17 in the form of a simple cylinder is mounted on a spindle with any suitable bearings in the walls 3. At points along the underside of the roof 4, fairleads or supports are provided for the chain, and these comprise H-shaped fittings with tracks 18 and a transverse stiffener 18A which are fixed, for example by bolts 18C, to the walls 3. The tracks 18 are rounded down as shown, to ensure that the chains 7 and 8 do not catch on them but are smoothly led. A chain tensioning device is provided which in this case provides initial tension for the chains and has the further important function of preventing clogging of material in the teeth of the sprockets 7A, 8A. This consists in a metal plate 19 of preferably springy nature which is scrolled at 20 whereby it is adapted to be secured in operative position by a transverse bolt through the walls 3 and shown at 20A, and at its other end is bent around an arc so that it meets the hubs of the sprockets 8A tangentially, follows arcuately around them, and is then turned back upon itself as at 21. The part which is so formed is sufficiently narrow to lie between the teeth of the sprockets, so that it virtually encloses the spindle 11 and prevents any material which might be lodged on the flights 9 from fouling or being thrown in such a way that it might jam the chains in their passage around the sprockets. Except where it has to lie between the sprockets, the plate 19 occupies practically the whole breadth of the trough, as is indicated in Figure 3. The plate is curved at its lower end at 22, and thus forms a fairlead for the chains, defining their depth.

To the end wall 2 there is secured a leaf spring 23 adapted to bear against the chains where they are still in engagement with the sprockets, to prevent jumping. With the direction of use as indicated by the arrow 10, it will be clear that the sprockets pull the upper run of the chain directly, and the chain passing around the idle terminal 17 duly pulls the other run in the opposite direction. The least loaded point of the chain is thus always that which is in the region of 22. If in the course of time, or for other reason, it is found necessary to shorten or detach the chains 7 and 8, the bolt 20A is withdrawn and the plate 19 can consequently swing about the axis of the spindle 11, thus in effect affording looseness of the chain, and this should preferably be sufficient for some chain to be raised clear of the trough for working purposes.

At the delivery end of this conveyer, parallel with and spaced below the roof 4 by approximately the thickness of the chain, is a baffle 24 which is a board suitably secured to the walls 3 and extending across the trough, with a tapered end at 25 to conform approximately with the terminal 17, and this board, as well as ensuring the departure of the chains from the terminal 17, will support and carry any material which may have been overcarried beyond the outlet 6, and return such overcarried material back to the main load which has been indicated as existing at 26.

It will be noted that the parts which may be required to be moved and transposed so that this conveyer can be reversed, for alternative use, are well adapted to this end. The parts 18 and 24 are simply detached by releasing them from the walls 3, for example by withdrawing their bolts or screws.

Turning to Figure 2, this illustrates how the conveyer of Figure 1 can be used in the reverse sense. The same parts are similarly indicated. The machine of Figure 2 is simply that of Figure 1 turned down, so that what was the floor 1 is now the roof, and the roof 4 is now the floor. The arrangements of the sprockets 8A, spindle 11, plate 9, and the parts connected therewith, remains unaffected, and the source of power should rotate the spindle 11 in the same sense as before. Constructional modification is made by removing the baffle 24 from its previous position and replacing it beneath the first part of the upper or idle run of the chains. A part only of the trough, divided for example on the line A—A of Fig. 1, may be inverted, the chain being removed and replaced in opposite operative sense. The baffle 24 will, when positioned as indicated in Fig. 2, in the run of the chain follow directly from the plate 19. The chute 5 or some other exit, is now the delivery chute, and any material overcarried may circulate with the chain and will be prevented from jamming the sprockets by the plate 19, the end 21 of which will be sufficient protection to avoid material rising over the sprockets, and the plate 19 will act as a shield, dumping overcarried material on to the baffle 24, whence it will fall off the end 25 back to the main load. The direction of action in this case is indicated by the arrow 26. The fairlead fittings 18A will be transposed to support what is now the upper run of the chain, and thus the conveyor can, with great ease, be made completely reversible. In order to aid the transposition of the fairleads 18, they are preferably secured or located by having circular cheeks 18B integral with them, which are inset so as to be flush in the walls 3 but which permit simple rotation of the whole fittings 18, 18A, when they are released, so that without even having to remove them from the trough they can be inverted so as to be effective in relation to the opposite run of chain. It should be noted that the driving source need not be reversible for this to be achieved, and also that the high degree of reversibility without structural alteration and with the minimum of trouble, contributes very considerably to standardization.

Turning to Figure 4, a modified form of tensioning device is indicated diagrammatically, in which there is substituted for the plate 19 a bracket or arm 40 carrying a jockey roller or rollers or sprockets 41 to engage the chain, such as 7. The arm 40 also carries on a suitable spindle 42 rollers 43 to hold the chain against the sprockets 7A to prevent jumping. The spindle 42 is somewhat slidable in slots 44 formed either in the walls of the trough or in brackets such as 45, and the upper end of the arm 40 extends through the roof 4, through a slot 46, and is externally loaded by a spring in tension 47. The spring 47 thus forcibly holds the rollers 43 against the chain where it passes over the sprocket 8A, and at the same time using that point of contact as a fulcrum, bears the roller 41 against the chain, acting as a jockey to maintain a predetermined tension. When it is desired to handle the chain, the spring 47 is released, whereupon the rollers 41, 43, virtually release the chain.

Figure 5 illustrates another form of chain tensioning means adapted to be fitted within the trough, and it is a cranked lever 50 mounted on an externally rotatable spindle 51 passing through bearings in the walls 3. A concavely curved face 52 formed on one side of the lever, bears against the hubs of the sprockets 8A in the same manner as the arcuately formed part of the plate 19 previously described. An extension 53 of the lever carries at its extremity a spindle 54 transverse of the trough, on which spindle a suitable fairleading or jockeying roller is provided over which the chain passes. Any suitable means for securing the spindle 51 are provided, whereby the spindle 54 can be positively positioned in the trough, but when it is desired to handle the chain the spindle 51 is freed so that the lever 50 can swing away from the sprocket 8A, loosening the chain.

Figure 6 illustrates a further modified tensioning device which consists in a manual method of adjustment or setting of the plate 19 of Figure 1, 2 or 3. In this case the scrolled part 20 of the plate surrounds a pin 60 on the end of a push-pull adjusting rod 61 which projects through a suitable hole at 62 in a plate 62A covering a larger hole in the lid 4, the rod 61 having externally any suitable manipulating means such as the handle 63, and also being notched as indicated at 64 to engage the edge of the hole 62, or having other means for locking it in operative position, maybe with some degree of adjustment. The rod 61 is to one side of the trough, so as to be clear of the chains and flights, and thus it may be desirable to duplicate the rod.

What I claim is:

1. In a conveyer of the character described, in combination, a conduit, a flexible endless conveyer member disposed within and traversable through the conduit, rotatable members around which said conveying element is arranged to pass, one of said members constituting a driving element and being of substantially less diameter than the depth of the conduit and a movable tensioning element adjacent the driving element cooperating with the conveying element in one position to maintain tension therein, and capable when moved into a second position of releasing the tension in the conveying element, and a flat spring member cooperating with said driving element and said conveyer member to retain the latter in operative relation to the driving element.

2. In a conveyer of the character described, in combination, a conduit, a conveying element disposed within and traversable through the conduit, sprockets around which said conveying element is arranged to pass and reversible guiding means cooperating with a portion of one run of said conveying element disposed between the sprockets and arranged to support said conveying element said reversible guiding means comprising runners rounded at their ends and rotary plates mounted in the walls of said conduit for supporting said runners.

3. In a conveyer of the character described, in combination, a conduit, a flexible endless conveyor member disposed within and traversable through the conduit, rotatable members around which said conveying element is arranged to pass, one of said members constituting a driving element and being of substantially less diameter than the depth of the conduit and a movable tensioning element adjacent the driving element cooperating with the conveying element in one position to maintain tension therein, and capable when moved into a second position of releasing the tension in the conveying element, and reversible guiding means cooperating with a portion of one run of said conveying element disposed between said rotatable members and arranged to support said conveying element.

4. In a conveyer of the character described, in combination, a conduit, a flexible endless conveyer member disposed within and traversable through the conduit, rotatable members around which said conveying element is arranged to pass, one of said members constituting a driving element and being of substantially less diameter than the depth of the conduit and a movable tensioning element adjacent the driving element cooperating with the conveying element in one position to maintain tension therein, and capable when moved into a second position of releasing the tension in the conveying element, and a removable baffle board positioned adjacent one of said rotatable members and adapted to support material being conveyed around said rotatable member and in cooperation with said rotatable member to redeliver such material to the main load.

5. In a conveyer of the character described, in combination, a conduit, a flexible endless conveying element disposed within and traversable through the conduit forming upper and lower runs, rotatable members around which said conveying element is arranged to pass, one of said members constituting a driving sprocket and being of substantially less diameter than the distance between said upper and lower runs, and a tensioning plate arranged adjacent said driving sprocket and cooperating therewith to guide said conveying element from one run to another said tensioning plate having one end curved about and in engagement with the hub of said driving sprocket and adjacent the teeth of the latter to prevent the material being conveyed from accumulating upon said hub and said sprocket whereby to prevent clogging of the material in the teeth of the latter.

6. In a conveyer of the character described, in combination, a conduit, a flexible endless conveying element disposed within and traversable through the conduit forming upper and lower runs, rotatable members around which said conveying element is arranged to pass, one of said members constituting a driving element and being of substantially less diameter than the depth of the conduit, and a tensioning plate arranged adjacent said driving element and cooperating therewith to guide said conveying element from one run to another, and a flat spring member also cooperating with said driving element and said conveying element to retain the latter in operative relation to the driving element.

7. In a conveyer of the character described, in combination, a conduit, a flexible endless conveying element disposed within and traversable through the conduit forming upper and lower runs, rotatable members around which said conveying element is arranged to pass, one of said members constituting a driving element and being of substantially less diameter than the distance between said upper and lower runs, a drive shaft connected with said driving element, and a plate arranged adjacent said driving element and cooperating therewith to guide said conveying element from one run to another, said plate having one end positioned in the space between the shaft of said driving element and said conveying element to prevent accumulation on the driving element of the material being handled, whereby to prevent clogging of the material between said driving element and said conveying element.

8. In a conveyer of the character described, in combination, a conduit, a flexible endless conveying element disposed within and traversable through the conduit forming upper and lower runs, rotatable members around which said conveying element is arranged to pass, one of said members constituting a driving element and being of substantially less diameter than the distance between said upper and lower runs, a driving shaft connected with said driving element, a plate arranged adjacent said driving element and cooperating therewith to guide said conveying element from one run to another, said plate having one end positioned in the space between the shaft of said driving element and said conveying element to prevent accumulation on the driving element of the material being handled, whereby to prevent clogging of the material between said driving element and said conveying element, and a flat spring member also cooperating with said driving element and said conveying element to retain the latter in operative relation to the driving element.

9. In a conveyer of the character described, in combination, a conduit, a flexible endless conveying element disposed within and traversable through the conduit forming upper and lower runs, rotatable members around which said conveying element is arranged to pass, one of said members constituting a driving sprocket and being of substantially less diameter than the distance between said upper and lower runs, a plate arranged adjacent said driving sprocket and cooperating therewith to guide said conveying element from one run to another, said plate having a curved portion at one end thereof positioned adjacent the teeth of said driving sprocket to prevent the material conveyed from accumulating upon the hub of said sprocket and clogging the teeth of said sprocket, and means holding the opposite end of said plate in position relative to said conduit.

10. In a conveyer of the character described, in combination, a conduit, a flexible endless conveying element disposed within and traversable through the conduit forming upper and lower runs, rotatable members around which said conveying element is arranged to pass, one of said members constituting a driving sprocket and being of substantially less diameter than the distance between said upper and lower runs, a tensioning plate arranged adjacent said driving sprocket and cooperating therewith to guide said conveying element from one run to another, said tensioning plate having a curved end portion positioned adjacent the teeth of said driving sprocket to prevent the material conveyed from accumulating upon the conveyer side of said driving sprocket and clogging the teeth of said sprocket, and means for adjustably positioning the other end of said tensioning plate to vary the tension in said conveying element.

11. In a conveyer of the character described, in combination, a conduit, a drive shaft disposed transversely of said conduit, a pair of driving sprockets in said conduit mounted on said drive shaft in spaced relation, a rotatable element, a flexible endless conveying element disposed in the conduit passing around said driving sprockets and rotatable element and forming upper and lower runs, said driving sprockets being of substantially less diameter than the distance between said upper and lower runs, a plate arranged adjacent to and between said driving sprockets and cooperating therewith to guide said conveying element from one run to another, said plate having a curved end portion positioned adjacent the teeth of said driving sprockets to prevent the material conveyed from accumulating upon the confronting sides of said driving sprockets and clogging the teeth thereof, and means for securing the opposite end of said plate in position relative to said conduit.

12. A conveyer of the character defined in claim 11, in which the means securing one end of the plate in position relative to the conduit is adjustable, whereby the tension in the conveying element may be varied as desired.

ARNOLD REDLER.